(12) United States Patent
Bjorg et al.

(10) Patent No.: US 9,864,876 B2
(45) Date of Patent: Jan. 9, 2018

(54) LIVE EDITING AND PUBLISHING OF DOCUMENTS WITHIN A CONTENT MANAGEMENT SYSTEM USING A HYBRID DRAFT AUTHORIZATION WORKFLOW

(71) Applicant: MindTouch, Inc., San Diego, CA (US)

(72) Inventors: Steve Bjorg, San Diego, CA (US); Yuri Gorokhov, San Diego, CA (US)

(73) Assignee: MindTouch, Inc., San Diego, CA (US)

( * ) Notice: Subject to any disclaimer, the term of this patent is extended or adjusted under 35 U.S.C. 154(b) by 0 days.

(21) Appl. No.: 15/097,260

(22) Filed: Apr. 12, 2016

(65) Prior Publication Data

US 2017/0277905 A1 Sep. 28, 2017

Related U.S. Application Data

(60) Provisional application No. 62/311,409, filed on Mar. 22, 2016.

(51) Int. Cl.
| | | |
|---|---|---|
| G06F 21/62 | (2013.01) | |
| G06F 17/30 | (2006.01) | |
| G06F 17/24 | (2006.01) | |
| G06F 3/0486 | (2013.01) | |
| G06F 17/21 | (2006.01) | |

(52) U.S. Cl.
CPC ........ *G06F 21/6218* (2013.01); *G06F 3/0486* (2013.01); *G06F 17/211* (2013.01); *G06F 17/248* (2013.01); *G06F 17/30011* (2013.01); *G06F 17/3089* (2013.01); *G06F 17/30321* (2013.01)

(58) Field of Classification Search
CPC ............ G06Q 10/103; G06F 17/30011; G06F 17/30289
See application file for complete search history.

(56) References Cited

U.S. PATENT DOCUMENTS

| | | | |
|---|---|---|---|
| 7,426,138 B1 | 9/2008 | Wong | |
| 9,081,463 B2 | 7/2015 | Taylor et al. | |
| 2002/0073125 A1* | 6/2002 | Bier | G06F 17/24 715/255 |
| 2004/0255247 A1* | 12/2004 | Demsky | H04L 67/38 715/234 |
| 2006/0074881 A1* | 4/2006 | Vembu | G06F 17/30545 |
| 2006/0259524 A1* | 11/2006 | Horton | G06F 17/24 |
| 2008/0148146 A1* | 6/2008 | Estrada | G06F 17/30873 715/255 |
| 2014/0195892 A1 | 7/2014 | Hampton | |

* cited by examiner

*Primary Examiner* — Andrew T McIntosh
(74) *Attorney, Agent, or Firm* — Knobbe, Martens, Olson & Bear, LLP (57) ABSTRACT

A system for live editing and publishing of documents within a content management system using a hybrid draft authorization workflow within an authoring component used for content creation, draft editing and/or published editing, to control and manage access, permissions, documents revisions, histories, and associated content in a real-time environment without a need for server administrator approval, as well as streamlined to avoid iterative revision issues, merging conflicts and associated complexities of collaborative editing.

7 Claims, 9 Drawing Sheets

LIVE EDITING AND PUBLISHING OF DOCUMENTS WITHIN A CONTENT MANAGEMENT SYSTEM USING A HYBRID DRAFT AUTHORIZATION WORKFLOW

CROSS-REFERENCE TO RELATED APPLICATIONS

This application claims the benefit of, and priority to, U.S. provisional patent application Ser. No. 62/311,409, titled "LIVE EDITING AND PUBLISHING OF DOCUMENTS WITHIN A CONTENT MANAGEMENT SYSTEM USING A HYBRID DRAFT EDITOR" and filed on Mar. 22, 2016, the entire specification of which is incorporated herein by reference in its entirety.

BACKGROUND OF THE INVENTION

Field of the Art

The disclosure relates to the field of managing content within content management systems, and more particularly to features of live editing and iterative drafting and publishing of content in a stored and indexed filing system operated and maintained on a computer or plurality of computers.

Discussion of the State of the Art

A content management system is a computer application generally used to store, manage, control and organize data to allow for a plurality of devices to gain access to files for the purpose of viewing, creating, editing, publishing, formatting or otherwise changing content in a collaborative environment. A content management system may facilitate document control, auditing, editing, and timeline management. In other applications, a content management system may serve as an electronic data management system, and may contain a plurality of file types, including, but not limited to, content such as documents, images, movies, phone numbers, scientific data, or any similar type of editable file. Content management systems are often used to run websites containing blogs, news, and shopping. Content management systems may be standalone applications or may be web-based or even operated in an enterprise environment.

A web content management system is a type of content management system that is used to control a dynamic collection of web material, which may include HTML documents, images, and/or other forms of media and provides website authoring, collaboration, and administration tools designed to allow users with little knowledge of web programming languages or markup languages to create and manage website content with relative ease. A web content management system typically requires a systems administrator and/or a web developer to set up and add features, but it is primarily a website maintenance tool for non-technical staff.

An enterprise content management system is another form of content management, combining the capture, search and networking of documents with digital archiving, document management and workflow. It specifically includes the special challenges involved in using and preserving a company's internal, often unstructured information, in all of its forms. Therefore, most enterprise content management solutions focus on business-to-employee (B2E) systems. Currently, enterprise content management system applications are generally delivered in three ways: on-premises software (installed on the organization's own network), software as a service (SaaS), or a hybrid solution comprising both on-premises and SaaS components.

Content management systems facilitate collaboration and enable access to content, however, management of these systems requires access through a known and established bottleneck in order to manage access, permissions, and/or changes to the content. The problem then becomes a function of time and efficiency of the management system, since collaboration of multiple users increases the complexity and time required for review cycles, accessibility to revision history, and ability to view changes made to a file until it has been approved by a party other than the editor.

What is needed in the art is an automated system for collaborative live editing of published content by synchronizing changes without needing to undergo an iterative review process or work via a de facto process bottleneck.

SUMMARY OF THE INVENTION

Accordingly, the inventor has conceived and reduced to practice, in a preferred embodiment of the invention, a computing system for synchronized collaborative live editing and publishing of content within a content management system.

According to a preferred embodiment of the invention, a system for live editing and publishing of documents within a content management system using a hybrid draft authorization workflow, comprising a content workflow server computer comprising a processor, a memory, and a plurality of programming instructions stored in the memory and operable on the processor, wherein the plurality of programming instructions is configured to: assign permissions for device protocols and accessibility to pages; create a page from a draft template, a blank page or an existing page as specified; store the page for future use in a draft database or a published database; organize pages in a hybrid-draft hierarchy; access stored pages from the draft database or published database for editing; and publish pages to the content management system is disclosed.

According to another preferred embodiment of the invention, a system for live editing to facilitate control and management of documents within a content management system using an authoring component, comprising a content management server computer comprising a processor, a memory, and a plurality of programming instructions stored in the memory and operable on the processor, wherein the plurality of programming instructions is configured to: create an index of content from a content database, an attachments database and a version control database; search for content within the content database, the attachments database and/or the version control database; retrieve content from the content database, the attachments database and/or the version control database for viewing or editing; customize content to create a new draft page, a new published page or a draft revision of a published page; enhance page customization by incorporating drag-and-drop functionality within the draft page; discard pages deemed unsuitable for publishing to a version control database; record changes made to pages, whether in form of edits, deletions, additions or formatting; store customized published pages in the version control database; and organize page hierarchies in the version control database to enhance search functions and results, is disclosed.

According to another preferred embodiment of the invention, a method for live editing and publishing content using a hybrid draft authorization workflow featured in an authoring component of a content management system in a real-time working environment, the method comprising the steps of: an access request is submitted to the authoring component for permission to access content within a content management system; an authentication database is searched to validate access to the content within the content management system; if permission is denied, access to the content management system is deflected; otherwise access is granted to search and view content in the forms of a page and page attributes within the content management system; content, stored in a content database, an attachment database, and/or a version control database, may be searched using a search function for the purpose of viewing content, or creating new content or editing existing content using an authoring component; authorization to access the authoring component is assigned by roles and permissions; if access is not authorized, only searching and viewing of content is allowed; if access to the authoring component is authorized, content may be selected from the content database, the attachment database, and/or the version control database for editing or creation of new content; changes made to selected content is logged in the version control database; changes may include editing, reviewing, adding, deleting, formatting, cancelling and/or attaching files resulting in a new page; authorization to publish is assigned by roles and permissions; page and page attribute changes are collected and prepared for publishing, and if publishing is authorized, publishing may commence; the published page and its attributes are indexed and stored in the version control database; otherwise changes to pages and/or attributes are discarded or cancelled, however, in either case, changes to pages and/or attributes are logged and stored in a version control database hierarchy, in either a draft stack or a published stack, for future access via the search function, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

The inventor has conceived, and reduced to practice, in a preferred embodiment of the invention, a system and method for synchronized collaborative live editing and publishing of content within a content management system by use of an authoring component with a hybrid draft authorization workflow.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
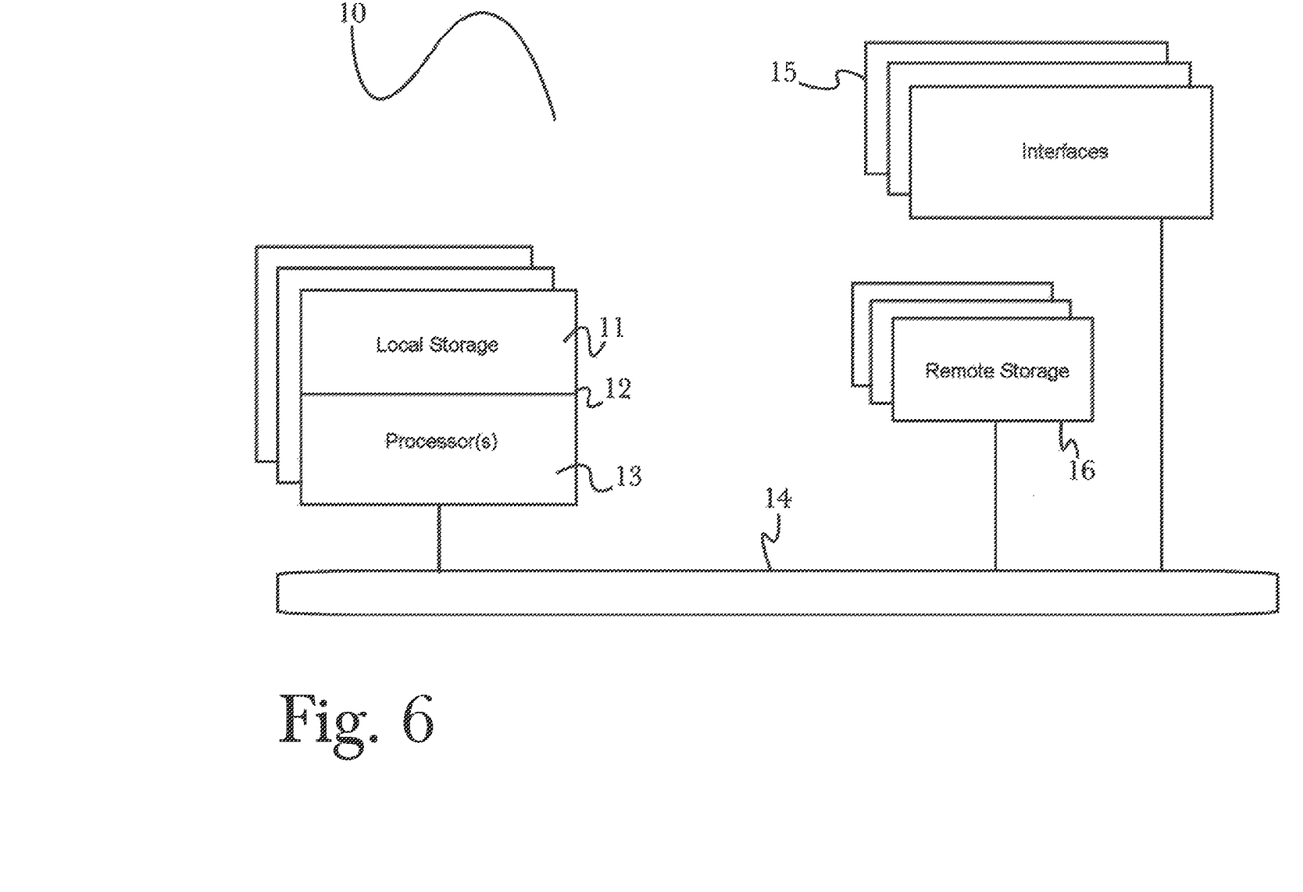
FIG. 6 is a block diagram illustrating an exemplary hardware architecture of a computing device used in an embodiment of the invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
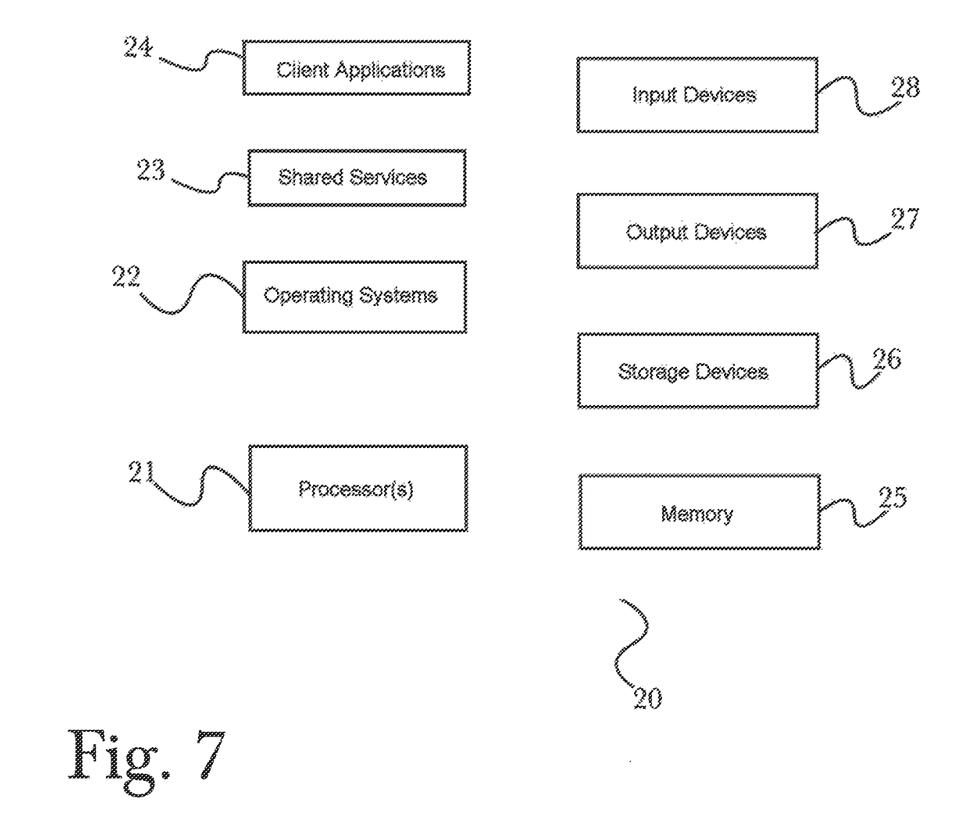
FIG. 7 is a block diagram illustrating an exemplary logical architecture for a client device, according to an embodiment of the invention.

In some embodiments, systems according to the present invention may be implemented on a standalone computing system. Referring now to FIG. 7, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 8:
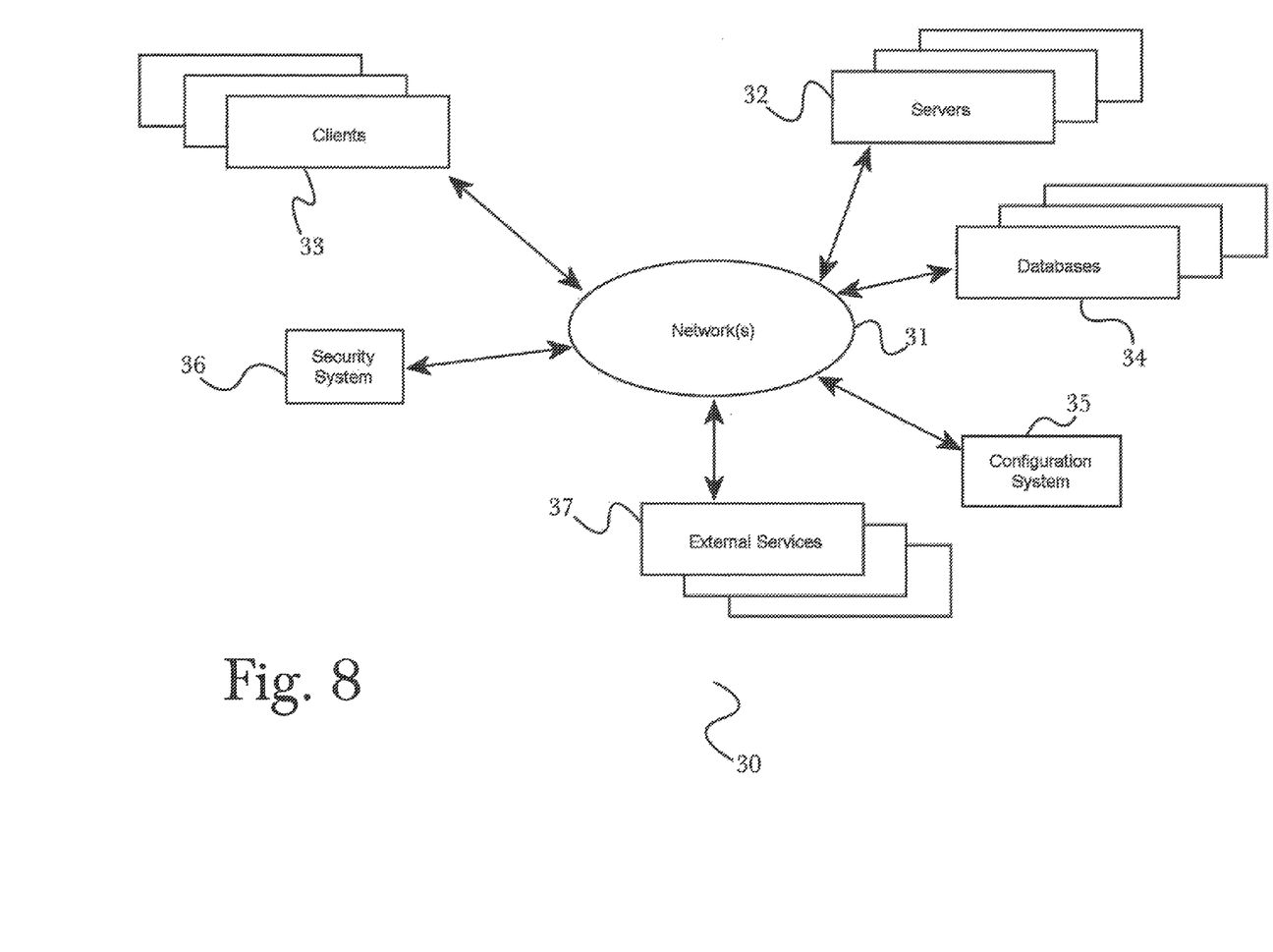
FIG. 8 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 8, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 9:
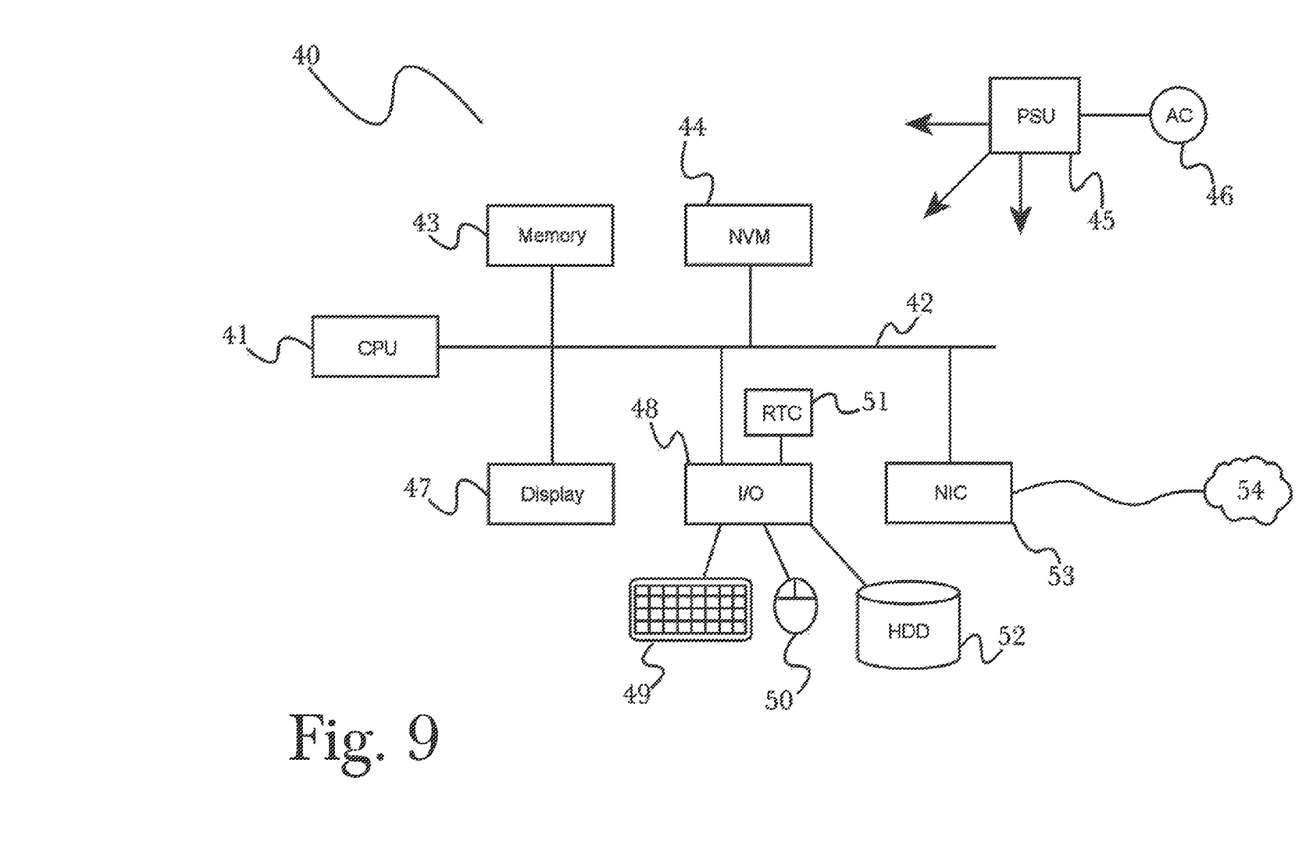
FIG. 9 is another block diagram illustrating an exemplary hardware architecture of a computing device used in various embodiments of the invention.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 1:
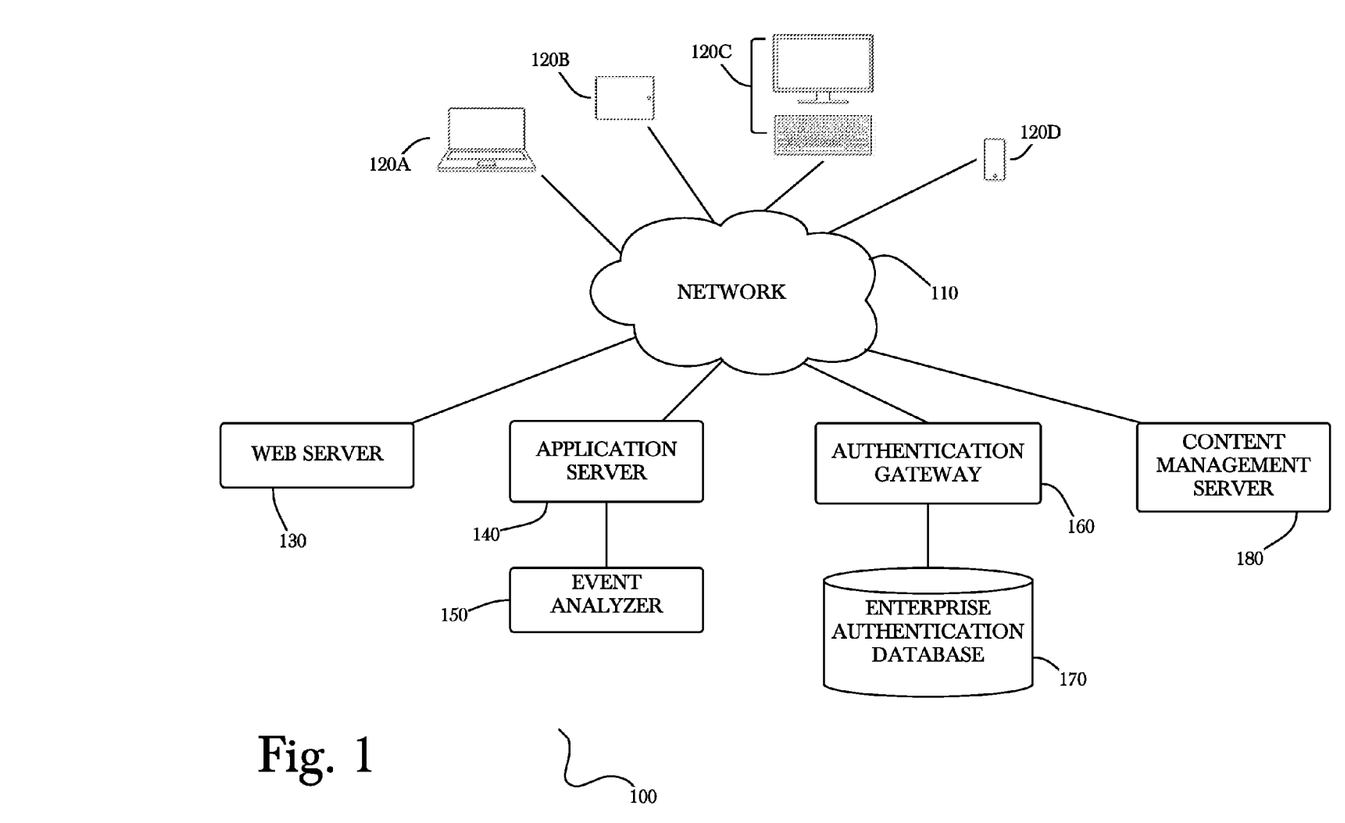
FIG. 1 is a block diagram of an exemplary architecture for a content management system that uses a web server, an application server, an authentication gateway and a content management server, according to a preferred embodiment of the invention.

FIG. 1 is a block diagram of an exemplary system architecture 100 for a hybrid draft authorization workflow 250 operable within a content management server 180, according to a preferred embodiment of the invention. According to the embodiment, a content management server 180 may be stored and be operable on a computing device, for example a laptop 120A, tablet 120B, work station 120C, smartphone 120D, or similar such device enabled to communicate via a network 110 with system 100, the system comprising a web server 130, an application server 140, an authentication gateway 160, and a content management server 180. The web server 130 may work in parallel with the application server 140, to process HTML requests from a browser, located on a computing device 120A/B/C/D, while the application server 140, utilizing an event analyzer 150 to evaluate requests, communicates with the web server 130, the authentication gateway 160, and the content manager 180, to carry out application specific code in response to browser commands, and in accordance with actions deemed allowable by the authentication gateway 160. For each device 120A/B/C/D, attempting to access the content management server 180, through web server 130, access is controlled by the authentication gateway 160, according to established permissions and settings stored in an enterprise authentication database 170.

It should be appreciated that according to the embodiment, various means of connection or communication between the components of system 100 may be utilized according to the invention interchangeably or simultaneously, such as for example a direct, physical data connection (such as via a data cable or similar physical means), a software-based connection such as via an application programming interface (API) or other software communication means (such as may be suitable, for example, in arrangements where multiple system components may operate on a single hardware device such as a computing server or workstation), or any of a variety of network connections such as via the Internet or other data communications network. It should therefore be appreciated that the connections shown are exemplary in nature and represent only a selection of possible arrangements, and that alternate or additional connections may be utilized according to the invention.

Figure 2:
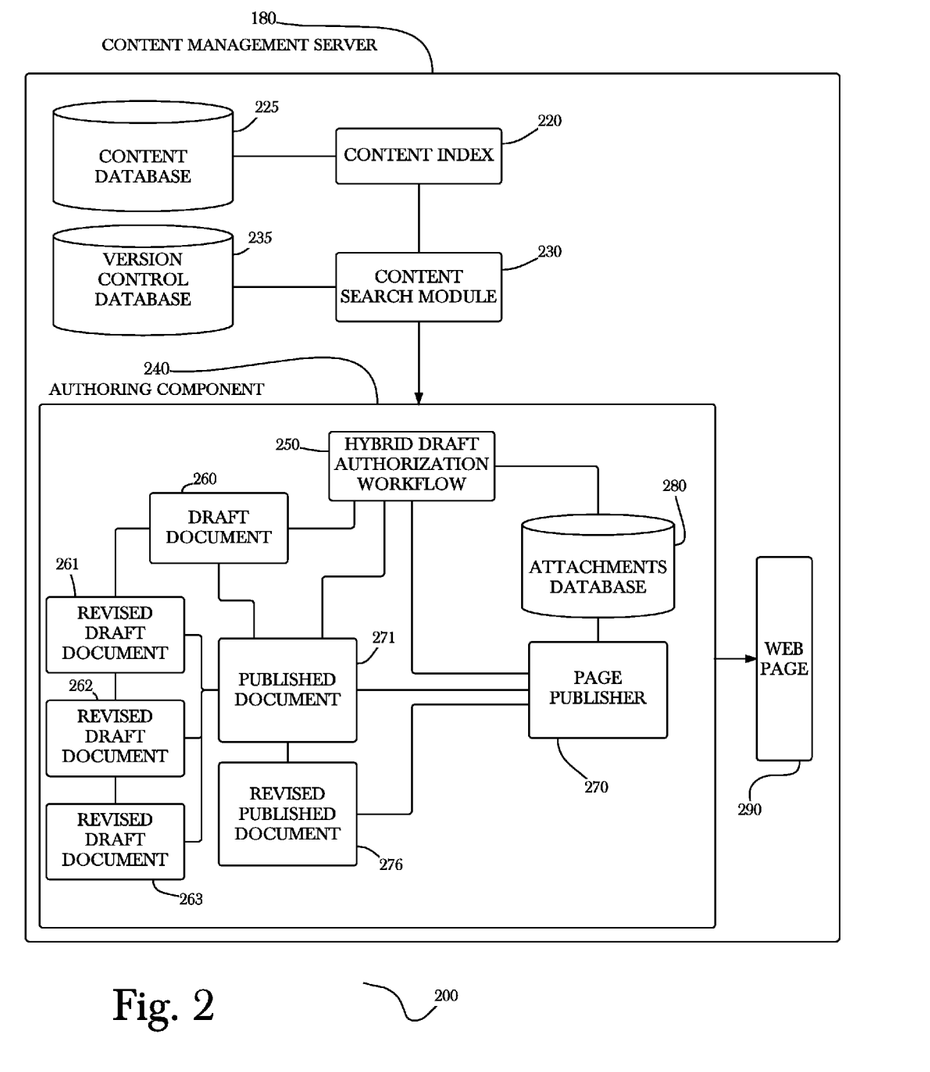
FIG. 2 is block diagram of an exemplary architecture for a live editing and publishing system that uses a hybrid draft authorization workflow and an authoring component used for content creation, draft editing and/or published editing, within the content management server, according to a preferred embodiment of the invention.

FIG. 2 is a block diagram of an exemplary system architecture 200 of the content management server 180, part of system 100, according to a preferred embodiment of the invention. According to the embodiment, a content management server 180 may be utilized, comprising a content index 220, which communicates with a content database 225, for the purpose of identifying and cataloging content; a content search module 230, in conjunction with a version control database 235, searches cataloged content located in the content database 225, via the content index 220 to provide results to a web page 290 as files or data with an allocated historical version, and may return more than one version of a document file or data file via the web page 290, according to revisions made within system 200 by an authoring component 240.

The authoring component 240, supplies system 200, with an authoring and editing feature, comprising a hybrid draft authorization workflow 250, and a page publisher 270. Using the authoring component, 240, content may be created within system 100, 200, as a product of a plurality of programming instructions received from devices 120, uninhibited by a requirement to gain approval or have specific code created for the purpose of illustrating the created content, as might be required, for example using extensible stylesheet language transformations (XSLT) without the use of system 100, 200. The authoring component 240, provides direct access to content for creation, editing and publishing, and by use of the hybrid draft authorization workflow 250, enables content to be created as a draft document 260 or directly as a published document 271, or based on a previous version's content, formatting and/or layout, as selected from the version control database 235, via the content search module 230, or may be used to create new content in draft form. The hybrid draft authorization workflow 250, may be used to retrieve stored content from an attachments database 280, where images, videos, media and/or published document format (PDF) files are stored, to be used with or within a draft document 260 or published document 271. Once the draft document 260 is created, it is logged in the version control database 235 as a draft and may be edited again, resulting in a revised draft document 261, which remains internal to system 200, or it may be finalized and presented as a published document 271. Published documents 271, 276, are processed by the page publisher 270, such that they become available for viewing on a web page 290, either immediately or at a predetermined time and date, for example, to publish a document to align with a given product release. Draft documents 260, 261, 262, 263, are logged historically and kept in a specific hierarchy within version control database 235. Similarly, published documents 271, 276, are logged and kept in a separate historical hierarchy within version control database 235. Documents that start in an unpublished state may be either logged as draft documents 260, 261, 262, 263, or if published, as published documents 271, 276. Draft documents 260, 261, 262, 263, may continue to be edited and revised without limit, despite the exemplary illustration identifying three revisions. Additionally, draft documents may be created to edit published document 271, however, the draft edits made to published document version 271 become viewable content as they occur, even before the revised published document 276 is completed and published by the page publisher 270. Historical logs of documents are never deleted; all versions of documents are saved in their respective draft/published stacks within version control database 235. Therefore, when a document is drafted, edited, published, cancelled and/or deleted, its history remains intact within version control database 235.

Figure 3:
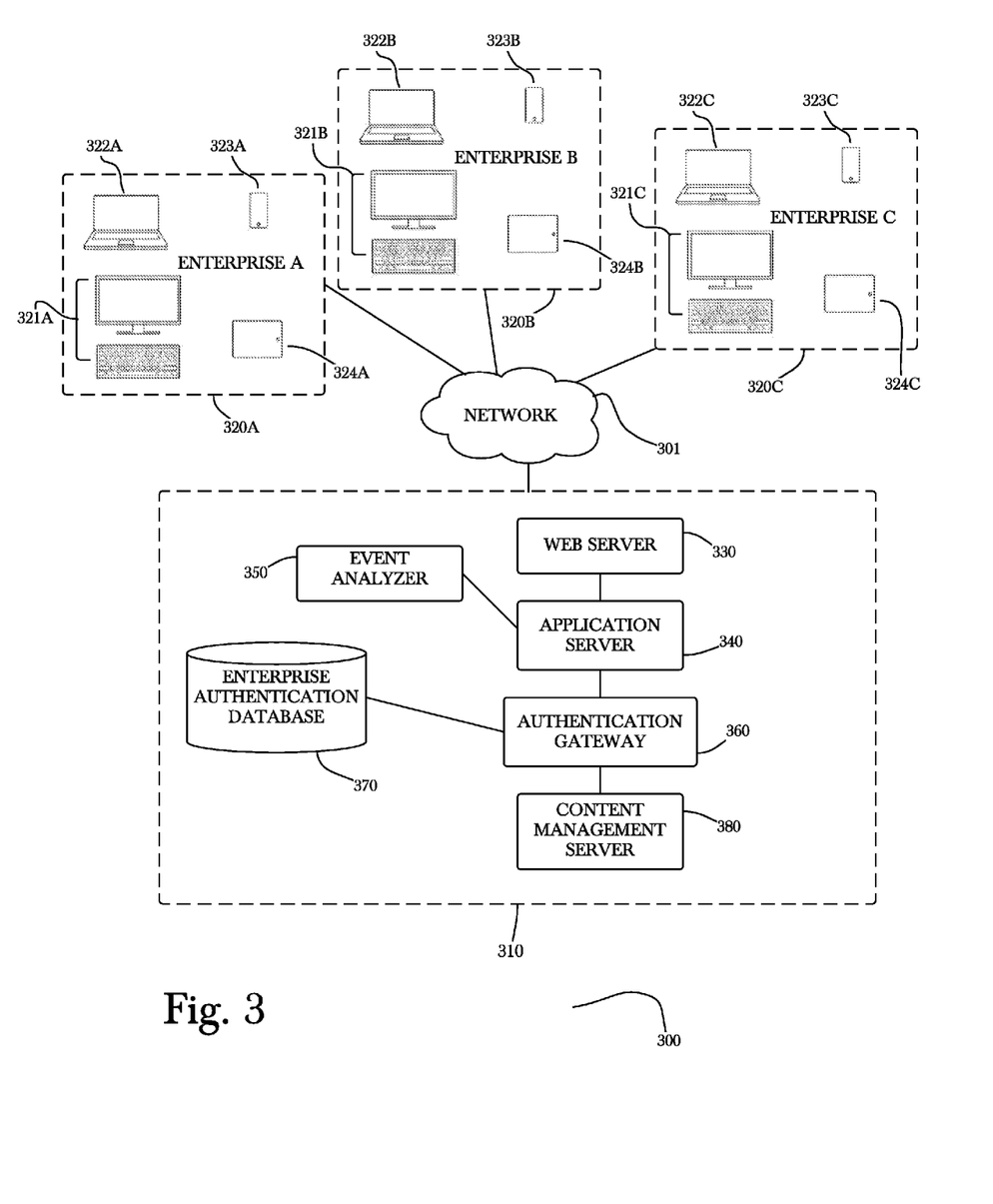
FIG. 3 is block diagram of an exemplary architecture for an enterprise content management system that uses a web server, an application server, an authentication gateway and a content management server, according to a preferred embodiment of the invention.

FIG. 3 is a block diagram of an exemplary system architecture 300 for a cloud based system 310, according to a preferred embodiment of the invention. Similar to the exemplary system architecture illustrated in FIG. 1, system 300, enables a plurality of logical business boundaries, hereby represented as enterprise 320A, 320B, 320C, to access system 310 via a network 301, yet access to other enterprises is restricted. While three enterprises are illustrated in FIG. 3, there may be a single enterprise or a plurality of enterprises; the use of three enterprises is for illustration and description purposes only. Enterprise A, 320A, may not access another enterprise, 320B, 320C, nor may Enterprise B, 320B, access other enterprises, 320A or 320C, and similarly for any enterprise connected to system 310 via network 301. An enterprise connected in system 300 connects for the purpose of communicating with system 310 in a cloud-based environment, for example, may include Amazon Web Services (AWS), Google App Engine, Microsoft Azure, IBM SmartCloud, or any similar such cloud based service. Computing devices within an enterprise 320A/B/C such as, for example, a workstation 321A/B/C, a laptop 322A/B/C, a smartphone 323A/B/C, tablet 324A/B/C are used within the business boundary of the respective enterprise 320A/B/C to access the cloud based system 310 in order to view, author, edit and/or publish content. System 310, comprises a web server 330, an application server 340, and event analyzer 350, an enterprise authentication database 370 which is accessed by an authentication gateway 360 to ensure computing devices within respective enterprises have the necessary permissions to access a content management server 380, detailed as per FIG. 2.

It should be appreciated that according to the preferred embodiments, various means of connection or communication between the components of system 310 may be utilized according to the invention interchangeably or simultaneously, such as for example a direct, physical data connection (such as via a data cable or similar physical means), a software-based connection such as via an application programming interface (API) or other software communication means (such as may be suitable, for example, in arrangements where multiple system components may operate on a single hardware device such as a computing server or workstation), or any of a variety of network connections such as via the Internet or other data communications network. It should therefore be appreciated that the connections shown are exemplary in nature and represent only a selection of possible arrangements, and that alternate or additional connections may be utilized according to the invention.

Detailed Description of Exemplary Method Embodiments

Figure 4:
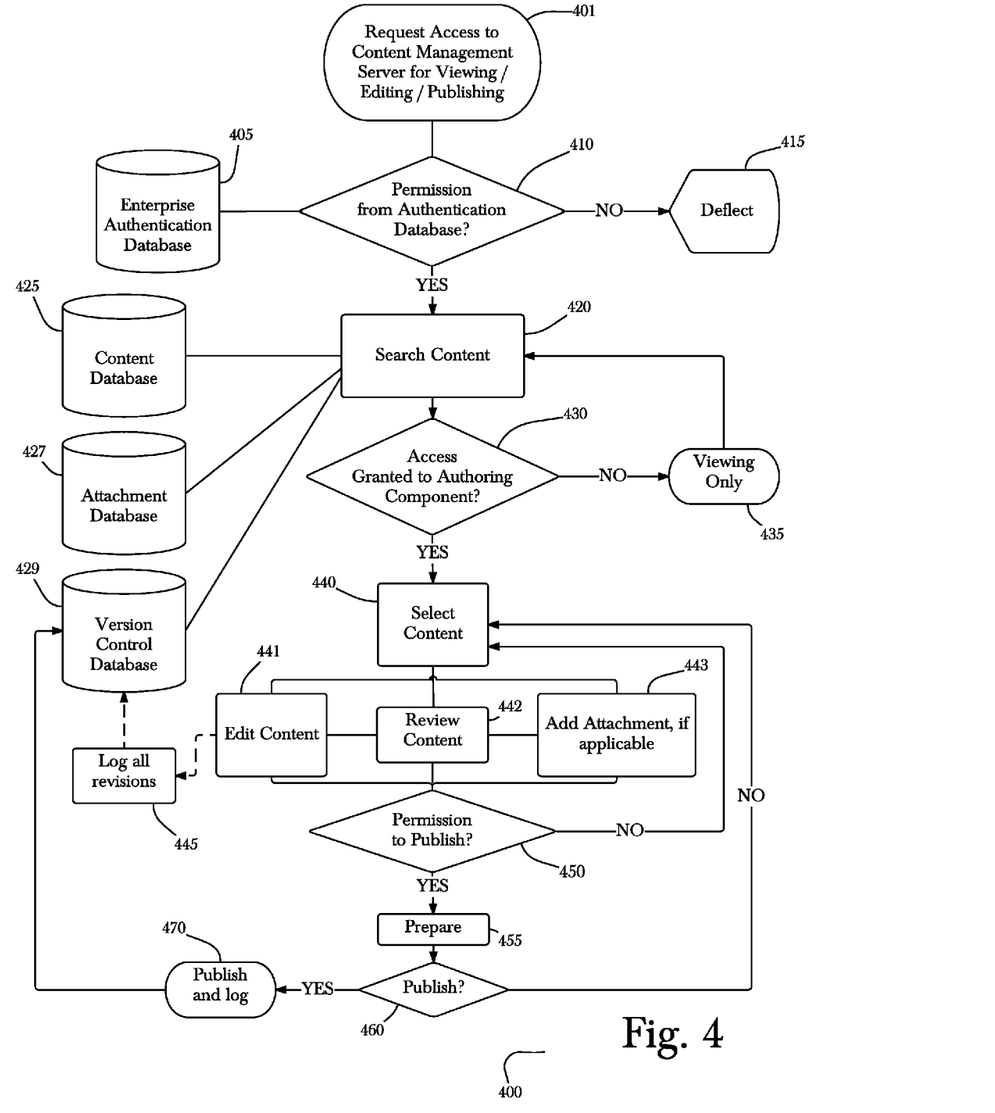
FIG. 4 is a process flow diagram of a method for live editing and publishing that uses a content management system and an authoring component using a system of the invention.

FIG. 4 is a process flow diagram illustrating an exemplary method 400 for viewing, authoring, editing and publishing content in a real-time environment using an authoring component 240, a hybrid draft authorization workflow 250, and a page publisher 270, within the content management server 180, 380, according to preferred embodiments of the invention. In an initial step 401, an applications server 140, 340, may receive a request from a computing device 120A/B/C/D or from a similar computing device within an enterprise 320A/B/C to access content stored within system 100 or 310, respectively, for the purpose of viewing, editing or publishing content within that system. Permission settings are stored within an enterprise authentication database 405, and are confirmed to allow for a search of content 420, or denied and deflected 415, by a gateway checkpoint 410 by confirming a device 120A/B/C/D, or enterprise 320A/B/C may be granted access to system 100, 310. Access to the content management server 180, 380 yields an ability to search content 420 within a content database 425, an attachment database 427, and/or a version control database 429. The content database 425 may contain, for example, pages, tags, properties such as free form key-value data, and/or an overview. The attachment database 427, may contain images, media or viewable files such as PDF or similar such graphical files. Version control database 429, may contain hierarchical, stacked versions of either draft documents or published documents or both in their respective categories. Another checkpoint 430 prevents unauthorized access to authoring component 240. In cases where access to the authoring component 240 is denied, viewing and searching content remains functional. Conversely, access to the authoring component 240 is granted and selection of content 440 may occur. Within the authoring component 240, content may be created, edited, reviewed, cancelled or deleted, and may include attachments. Existing content selected 440 from a database 425/427/429 may be edited 441, reviewed 442, with an option for attachments to be included 443. A publishing permission checkpoint 450 allows for a mandatory review process to be enabled before reviewed edits being compiled and prepared 455, for publishing 460. Changes made to drafts are logged 445 and changes made to published documents are also logged 470. Logging of documents in a parallel fashion allows for revision history to be stored such that revision history is stacked in two stacks: draft and published. When a draft edit to a published page is in progress, the current content of the published page cannot be edited under the same revision until editing of that revision is complete. However, a different revision may be started from the current content of the published page prior to completion of referenced revision above. Hence, a published document undergoing a single workflow revision may not be edited by more than one computing device at a time, although collaborative editing using a plurality of computing devices within a single workflow may be possible. In this way, published page history does not converge with draft page history, thereby alleviating merging conflicts which increase the level of complexity.

Figure 5:
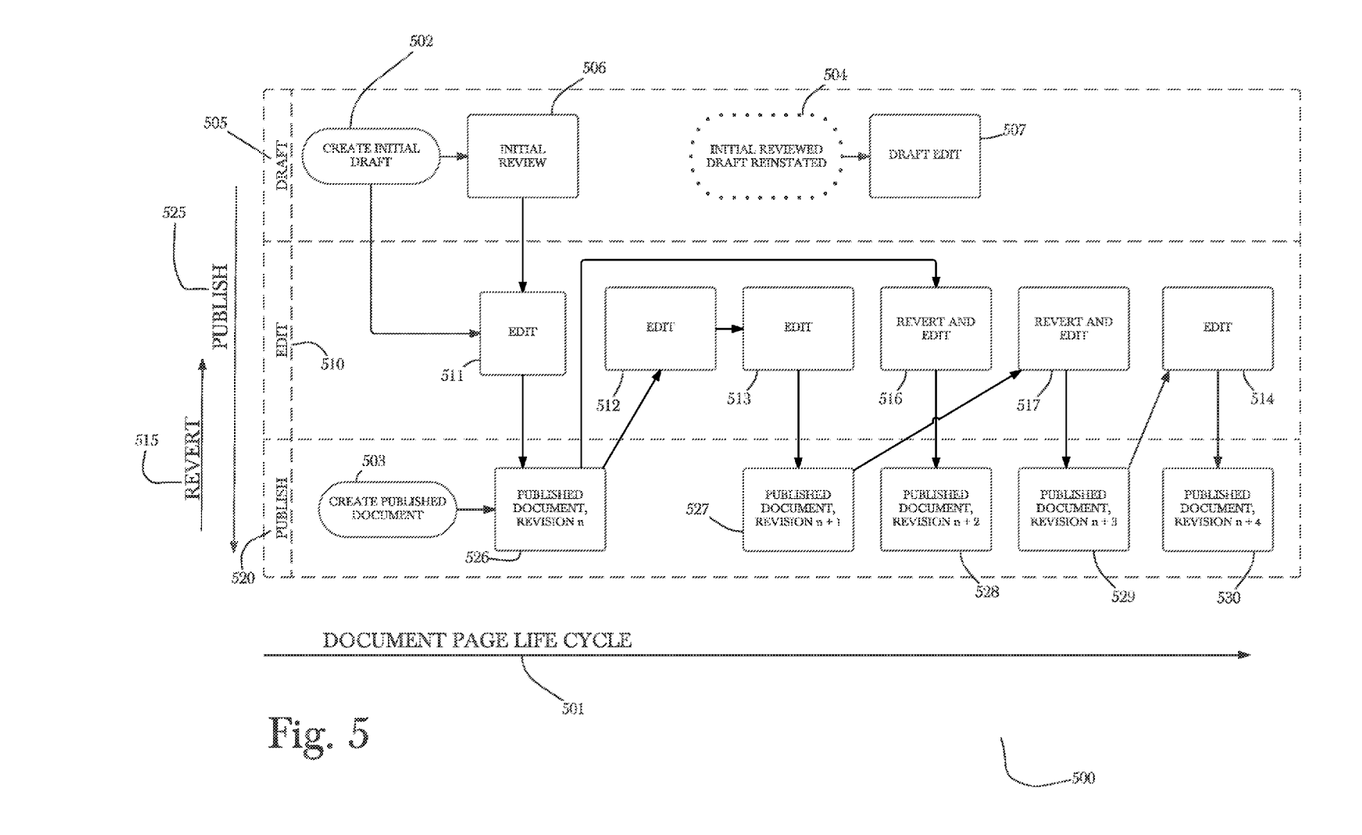
FIG. 5 is an exemplary state transition diagram illustrating a plurality of events that may occur in one or more possible stages according to a preferred embodiment of the invention.

FIG. 5 is an exemplary state transition diagram 500 illustrating the stages of document page life cycle 501, according to a preferred embodiment. It should be noted that document pages are a type of content which may be stored within system 100, 310, and that other content may undergo similar stages during respective life cycles. In a preferred embodiment of the invention, there may be as many as three stages for a document during its life cycle: draft 505, edit 510, and publish 520. An initial draft document may be created 502 before being published 526, or a document may start in a published state directly 503, however in the former case, an initial draft document may undergo an initial review 506 while in the draft 505 state. Assuming the initial review 506 results in a need for edits 511 to be made, the initial draft with review comments progresses from the draft 505 state to the edit 510 state. However, it is also possible that initial draft 502 may progress to an edited state 511. Initial review 506 is not compulsory. Progression from draft 505 to edit 510 is one way; once an initial draft 502 has been created, it cannot be created again; it is logged and stored in version control database 235, 429. Similarly, if an initial review 506 has been conducted, further reviews may only exist within the edit 510 state. However, once progressed to the edit 510 stage, a document page may be edited 511 in order to progress towards publishing 525 or revert 515 from a published state 526 back to an edited state 512. Alternatively, a draft may be reinstated 504, such that draft editing may continue 507 within the draft 505 stage, in a possible case where permission to publish has not been granted. By way of example, a published document may undergo a plurality of editing revision combinations before being published, as is exemplified in a case in sequence 526-512-513-527 resulting in revision history n+1 at 527, or in a case 526-516-528 where current page revision 527, denoted as "n+1" is abandoned and replaced by an edited version of 526, resulting in 528 at an "n+2" revision. In another example, sequence 527-517-529 denotes a situation where a previously logged revision is 527 is reverted and edited 517 to bring an "n+1" version to a current revision 529 at "n+3". The leapfrog instances described are described as possibilities, but chronological revision scenarios may also occur, as in case 529-514-530 where revision "n+4" is an edited version of "n+3".

The skilled person will be aware of a range of possible modifications of the various embodiments described above. Accordingly, the present invention is defined by the claims and their equivalents.

What is claimed is:

1. A system for live editing and publishing of documents within a content management system using a hybrid draft authorization workflow, comprising:

a hybrid-draft hierarchy including page entries for pages processed by the system, wherein an individual page entry of the page entries includes: (i) a content identifier, and (ii) at least one of a draft page identifier or a published page identifier; and a content workflow server computer comprising a processor, a memory, and a plurality of programming instructions stored in the memory and operable on the processor, wherein the plurality of programming instructions is configured to:

assign permissions for device protocols and accessibility to pages;

receive, from a first computing device, a request to edit an existing page of content, wherein a page entry for the existing page in the hybrid-draft hierarchy includes: (i) an identifier for the existing page, (ii) an identifier for a draft page created by the request, and (iii) an identifier for the content, wherein the draft page includes the content of the existing page;

store, in a draft database, the draft page in association with the identifier for the draft page created by the request;

receive, from a second computing device, a request to edit the content including the identifier for the content;

retrieve, from the hybrid-draft hierarchy, the identifier for the draft page based at least on the identifier for the content;

determine that the first computing device has completed editing of the draft page based at least in part on a record included in a version control database;

authorize the second computing device to edit the draft page based at least in part on a permission for device protocols and accessibility to pages;

retrieve, from the draft database, the draft page based at least in part on the identifier retrieved from the hybrid-draft hierarchy; and transmit the draft page to the second computing device for editing, wherein the content workflow server allows creation of content directly as a published document and allows live editing of published documents in real time.

2. The system of claim 1, further comprising:

a content management server computer comprising a processor, a memory, and a plurality of programming instructions stored in the memory and operable on the processor, wherein the plurality of programming instructions is configured to:

(a) create an index of content from a content database, an attachments database and a version control database;

(b) search for content within the content database, the attachments database and/or the version control database;

(c) retrieve content from a draft stack or a published stack of the content database, the attachments database and/or the version control database for viewing or editing;

(d) customize content to create a new draft page, a new published page or a draft revision of a published page;

(e) enhance page customization by incorporating drag-and-drop functionality within the draft page;

(f) discard pages deemed unsuitable for publishing to a version control database;

(g) record changes made to pages, whether in form of edits, deletions, additions or formatting;

(h) store customized published pages in the version control database; and (i) organize hybrid-draft page hierarchies in the version control database to enhance search functions and results.

3. The system of claim 1 further comprising an attachments database configured to receive requests for stored content.

4. The system of claim 3, wherein the attachments database contains images, media, or viewable files to be used with or within the draft page.

5. The system of claim 1, wherein the content workflow system is configured to:

receive a publication time and date for the at least one draft page; and publish the at least one draft page at the received publication time and date, wherein publishing the at least one draft page comprises processing the at least one draft page with a page publisher such that the at least one draft page because available for viewing on a web page.

6. The system of claim 1, wherein the content workflow system is configured to:

log, in the draft database, the date and time the at least one draft page was created;

store, in the draft database, a second draft page, wherein the second draft page is stored in a historical hierarchy with the first draft page, wherein the historical hierarchy is based at least in part on a previously logged date and time indicating when the at least one draft page was created.

7. The system of claim 1 further comprising:

an authentication database containing permission settings for the system, wherein a permission setting included in the permission settings indicates whether the user is allowed to search for content or whether the user is allowed to edit content; and a gateway checkpoint configured to:

receive a request for the user to access functionality of the system;

determine that the user is permitted to access the functionality, said determining based at least in part on the permission settings; and provide access to the functionality associated with the request.

* * * * *